United States Patent
Lee et al.

(10) Patent No.: US 10,133,119 B2
(45) Date of Patent: Nov. 20, 2018

(54) ILLUMINATING APPARATUS AND LIQUID CRYSTAL DISPLAY HAVING THE SAME

(71) Applicant: SAMSUNG ELECTRONICS CO., LTD., Suwon-si (KR)

(72) Inventors: Young-min Lee, Bucheon-si (KR); Kye-hoon Lee, Suwon-si (KR); Yong-hun Kwon, Anyang-si (KR); Jong-hoi Kim, Suwon-si (KR); Kun-ho Cho, Suwon-si (KR); Suk-ju Choi, Jeonju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/647,822

(22) Filed: Jul. 12, 2017

(65) Prior Publication Data
US 2017/0307938 A1    Oct. 26, 2017

Related U.S. Application Data

(62) Division of application No. 14/171,850, filed on Feb. 4, 2014, now Pat. No. 9,733,516.

(30) Foreign Application Priority Data

Jun. 3, 2013 (KR) .......................... 10-2013-0063619

(51) Int. Cl.
*F21V 21/005* (2006.01)
*G02F 1/1335* (2006.01)
*F21K 9/27* (2016.01)

(52) U.S. Cl.
CPC .......... *G02F 1/133608* (2013.01); *F21K 9/27* (2016.08); *F21V 21/005* (2013.01); *G02F 1/133603* (2013.01); *G02F 1/133611* (2013.01)

(58) Field of Classification Search
CPC ............. F21V 21/005; G02F 1/133608; G02F 1/133603; G02F 1/133611
See application file for complete search history.

(56) References Cited

U.S. PATENT DOCUMENTS

| 6,332,690 B1 | 12/2001 | Murofushi |
| 7,667,786 B2 | 2/2010 | Nouchi et al. |

(Continued)

FOREIGN PATENT DOCUMENTS

| DE | 198 48 842 A1 | 5/1999 |
| EP | 1801637 A1 | 6/2007 |

(Continued)

OTHER PUBLICATIONS

Communication dated Aug. 15, 2017, from the State Intellectual Property Office of People's Republic of China in counterpart Application No. 201410230947.1.

(Continued)

*Primary Examiner* — Jessica M Merlin
(74) *Attorney, Agent, or Firm* — Sughrue Mion, PLLC

(57) ABSTRACT

An illuminating apparatus includes a support member comprising a light source support member having four corner areas; and a light emitter that is disposed on a surface of the light source support member, the light emitter including one or more light emitting modules, wherein each of the light emitting module comprises a strip-shaped printed circuit board (PCB) mounted on the light source support member and a plurality of light source packages that is mounted on the strip-shaped PCB and generates light; and four corner side extending portions that configure a portion of any one of one or more the light emitting modules and are extended toward the four corner areas of the light source support member.

4 Claims, 15 Drawing Sheets

(56) References Cited

U.S. PATENT DOCUMENTS

| | | | |
|---|---|---|---|
| 2002/0001187 A1 | 1/2002 | Murofushi | |
| 2006/0193148 A1* | 8/2006 | Bang | G02F 1/133603 362/607 |
| 2007/0146569 A1 | 6/2007 | Nouchi et al. | |
| 2007/0279937 A1 | 12/2007 | Hsiao et al. | |
| 2008/0111471 A1* | 5/2008 | Blumel | F21K 9/00 313/502 |
| 2012/0099295 A1 | 4/2012 | Yokota | |
| 2013/0342787 A1 | 12/2013 | Hineno | |

FOREIGN PATENT DOCUMENTS

| | | |
|---|---|---|
| JP | 2007-171681 A | 7/2007 |
| JP | 2007317423 A * | 12/2007 |
| JP | 2012-190662 A | 10/2012 |
| KR | 10-2011-0025493 A | 3/2011 |
| KR | 10-1251869 B1 | 4/2013 |
| KR | 10-1261881 A | 5/2013 |
| WO | 00/50807 | 8/2000 |
| WO | 2011004683 A1 | 1/2011 |

OTHER PUBLICATIONS

Partial European Search Report dated Sep. 19, 2014 issued by European Patent Office in counterpart European Patent Application No. 14153933.8.

Communication dated Jan. 28, 2015 issued by the European Patent Office in counterpart European Application No. 14153933.8.

International Search Report dated Mar. 27, 2014, from the International Searching Authority in counterpart International Application No. PCT/KR2013/011124.

Written Opinion dated Mar. 27, 2014, from the International Searching Authority in counterpart International Application No. PCT/KR2013/011124.

Korean Office Action dated Apr. 28, 2014, from the Korean Intellectual Property Office in counterpart Korean Application No. 10-2013-0063619.

* cited by examiner

Related Art

ILLUMINATING APPARATUS AND LIQUID CRYSTAL DISPLAY HAVING THE SAME

CROSS-REFERENCE TO RELATED APPLICATION(S)

This application is a divisional of U.S. patent application Ser. No. 14/171,850, filed Feb. 4, 2014, and claims priority from Korean Patent Application No. 10-2013-0063619, filed Jun. 3, 2013, in the Korean Intellectual Property Office, the disclosures of which are incorporated herein by reference in their entireties.

BACKGROUND

1. Field

Apparatuses and methods consistent with exemplary embodiments relate to an illuminating apparatus and a liquid crystal display having the same, and particularly, to an illuminating apparatus that uses light-emitting diodes as a light source and a liquid crystal display having the same.

2. Description of the Related Art

A light-emitting diode (LED) is a semiconductor device which generates light, and has advantages of high energy efficiency, long life, etc. Accordingly, it has been used in a variety of industries.

In the related art, one light emitting module that uses light-emitting diodes as a light source is a light emitting module having a form in which a large number of LED packages consisting of a light-emitting diode, a fluorescent member, an electrode, etc. are mounted on a long strip-shaped printed circuit board (PCB). For example, such a light emitting module may be applied to be mounted on an inner surface of a support member (a component is often referred to as a bottom chassis) that is arranged behind a liquid crystal panel in a liquid crystal display, thereby providing light to the liquid crystal panel by a direct lighting method.

However, in the case of this application method, a problem in which light uniformity is low in the four corner areas or a central area of the support member is often found.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments relate to improving light uniformity of an illuminating apparatus to which a light emitting module of the form in which a large number of LED packages are mounted on a strip-shaped printed circuit board is applied, and a liquid crystal display equipped with the illuminating apparatus.

According to an aspect of an exemplary embodiment, there is provided an illuminating apparatus including: a support member including a light source support member having four corner areas; and a light emitter that is disposed on a surface of the light source support member, the light emitter including: one or more light emitting modules, wherein each of the one or more light emitting modules includes a strip-shaped printed circuit board (PCB) mounted on the light source support member and a plurality of light source packages that is mounted on the strip-shaped PCB and configured to generate light; and four corner side extending portions that configure a portion of any one of the one or more light emitting modules and are extended toward the four corner areas of the light source support member.

Each of the corner side extending portions may extend along a direction that divides a corresponding corner area into two areas.

The light source support member of the support member may have a rectangular plate shape.

The light emitter may include one light emitting module including the four corner side extending portions. The light emitting module may include: a body portion extended along a widthwise direction or a lengthwise direction of the light source support member; first and second corner side extending portions of the four corner side extending portions extended from one end of the body portion to first and second corner areas of the four corner areas of the light source support member; and third and fourth corner side extending portions of the four corner side extending portion extended from the other end of the body portion to third and fourth corner areas of the four corner areas of the light source support member.

The light emitter may include a first light emitting module and a second light emitting module. The first light emitting module may include: a first body portion extended along one direction; a first corner side extending portion of the four corner side extending portions extended from an end of the first body portion to a first corner area of the four corner areas of the light source support member; and a second corner side extending portion of the four corner side extending portions extended from the other end of the first body portion to a second corner area of the four corner areas of the light source support member. The second light emitting module may include: a second body portion disposed parallel to the first body portion of the first light emitting module; a third corner side extending portion of the four corner side extending portions extended from an end of the second body portion to a third corner area of the four corner areas of the light source support member; and a fourth corner side extending portion of the four corner side extending portions extended from the other end of the second body portion to a fourth corner area of the four corner areas of the light source support member.

The light emitting unit may include at least one additional light emitting module having no corner side extending portions.

Each of the light source packages may include a light-emitting diode.

According to an aspect of another exemplary embodiment, there is provided a liquid crystal display including: a support member including a light source support member having four corner areas; a cover member that is disposed in front of the support member and configured to cover the support member; a liquid crystal panel that is disposed between the support member and the cover member and configured to display video; and a light emitter that is disposed on an inner surface of the light source support member, the light emitter including: one or more light emitting modules, wherein each of the one or more light emitting modules includes a strip-shaped printed circuit board mounted on the light source support member and a plurality of light source packages that is mounted on the printed circuit board and configured to provide light to the liquid crystal panel; and four corner side extending portions that configure a portion of any one of the one or more light emitting modules and are extended toward the four corner areas of the light source support member.

According to an aspect of another exemplary embodiment, there is provided an illuminating apparatus including: a support member including a light source support member; and a light emitter that is disposed on a surface of the light source support member and includes one or more light emitting modules, wherein each of the one or more light emitting modules includes a strip-shaped printed circuit board mounted on the light source support member and a plurality of light source packages that is mounted on the printed circuit board and configured to provide light, wherein the light source support member has non-uniform depth and is formed in a concave shape having a maximum depth in a central area thereof.

The light source support member may have a curved plate shape.

The light source support member may have a flat plate shape is bent into two or more portions by at least one bending line.

The light source support member may be bent into a first support portion and a second support portion by one bending line, and at least one of the one or more light emitting modules may be mounted on each of the first support portion and the second support portion.

The light source support member may be bent into a first support portion, a second support portion, and a third support portion by two bending lines, and at least one of the one or more light emitting modules is mounted on each of the first support portion, the second support portion, and the third support portion.

The light source support member may have four corner areas, and the light emitter may include four corner side extending portions that configure a portion of any one of the one or more the light emitting modules and are extended toward the four corner areas.

According to an aspect of another exemplary embodiment, there is provided a liquid crystal display including: a support member including a light source support member having four corner areas; a cover member that is disposed in front of the support member and configured to cover the support member; a liquid crystal panel that is disposed between the support member and the cover member and configured to display video; and a light emitter that is disposed on an inner surface of the light source support member and includes one or more light emitting modules, wherein each of the one or more light emitting module includes a strip-shaped printed circuit board mounted on the light source support member and a plurality of light source packages that is mounted on the strip-shaped printed circuit board and configured to provide light to the liquid crystal panel, wherein the light source support member has non-uniform depth along a direction and is formed as a concave shape having a maximum depth in a central area thereof.

According to an aspect of another exemplary embodiment, there is provided a backlight including: a support member having four corner areas; and a light emitter disposed on a surface of the support member, wherein the light emitter includes at least one strip-shaped body portion and four strip-shaped corner side extending portions, wherein the at least one strip-shaped body portion extends in a longitudinal direction with respect to the support member and the four strip-shaped corner side extending portions each extend from any one of the at least one strip-shaped body portion toward a different corner area of the four corner areas such that each of the strip-shaped four corner side extending portions forms an obtuse angle with respect to a corresponding strip-shaped body portion.

The light emitter may include a single strip-shaped body portion of the at least one strip-shaped body portion. First and second strip-shaped corner side extending portions of the four strip-shaped corner side extending portions may extend from a first end of the single strip-shaped body portion toward first and second corner areas of the four corner areas. Third and fourth strip-shaped corner side extending portions of the four strip-shaped corner side extending portions may extend from a second end of the single strip-shaped body portion toward third and fourth corner areas of the four corner areas.

The light emitter may include a first strip-shaped body portion and a second strip-shaped body portion of the at least one strip-shaped body portion. A first strip-shaped corner side extending portion of the four strip-shaped corner side extending portions may extend from a first end of the first strip-shaped body portion toward a first corner area of the four corner areas. A second strip-shaped corner side extending portion of the four strip-shaped corner side extending portions may extend from a second end of the first strip-shaped body portion toward a second corner area of the four corner areas. A third strip-shaped corner side extending portion of the four strip-shaped corner side extending portions may extend from a first end of the second strip-shaped body portion toward a third corner area of the four corner areas. A fourth strip-shaped corner side extending portion of the four strip-shaped corner side extending portions may extend from a second end of the first strip-shaped body portion toward a fourth corner area of the four corner areas.

The light emitter may further include at least one additional strip-shaped body portion of the at least one strip-shaped body portion disposed between the first strip-shaped body portion and the second strip-shaped body portion.

The surface of support member may have a concave shape.

Thee at least one strip-shaped body portion and the four strip-shaped corner portions may be printed circuit boards.

Each of the at least one strip-shaped body portion and the four strip shaped corner portions may include at least one light-emitting diode disposed thereon.

According to an aspect of another exemplary embodiment, there is provided a backlight including: a support member having a surface, a first corner area, a second corner area, a third corner area, and a fourth corner area; and a plurality of strip-shaped printed circuit board (PCB) portions having disposed thereon at least one light-emitting diode, wherein the plurality of strip-shaped PCB portions is disposed on the surface of the support member, and wherein the plurality of strip-shaped PCB portions includes: a first corner side extending portion disposed in a first direction extending toward the first corner area; a second corner side extending portion disposed in a second direction extending toward the second corner area; a third corner side extending portion disposed in a third direction extending toward the third corner area; a fourth corner side extending portion disposed in a second direction extending toward the fourth corner area; at least one body portion disposed in a fifth direction.

The surface of support member may have a concave shape.

BRIEF DESCRIPTION OF THE DRAWINGS

These and/or other aspects and advantages will become apparent and more readily appreciated by describing certain exemplary embodiments, taken in conjunction with the accompanying drawings in which.

DETAILED DESCRIPTION OF EXEMPLARY EMBODIMENTS

Figure 1:
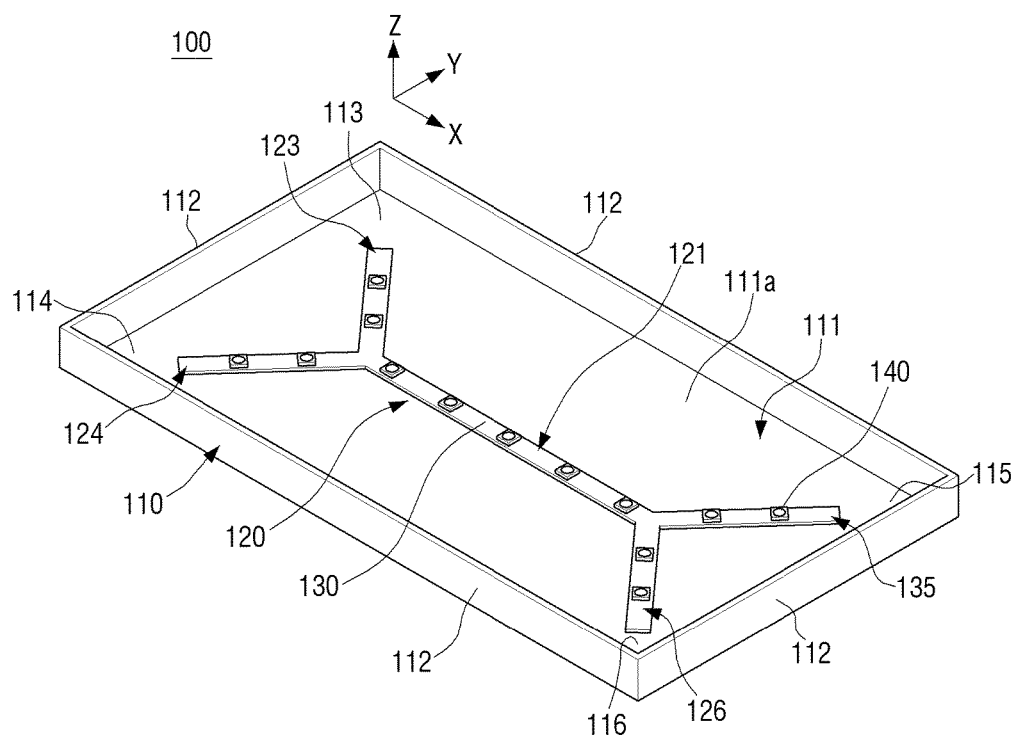
FIG. 1 is a perspective view schematically illustrating an illuminating apparatus according to a first exemplary embodiment.

Hereinafter, certain exemplary embodiments will be described in detail with reference to the accompanying drawings. Throughout the drawings, like reference numerals will be understood to refer to like parts, components, and structures.

The matters defined herein, such as a detailed construction and elements thereof, are provided to assist in a comprehensive understanding of exemplary embodiments. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding of exemplary embodiments.

Figure 2:
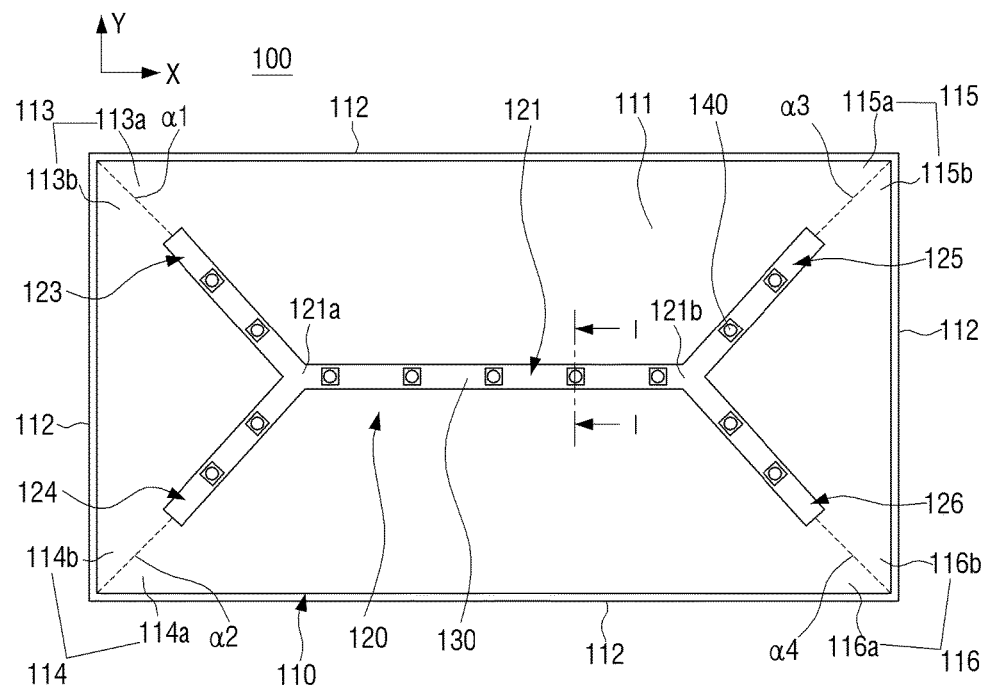
FIG. 2 is a plan view of the illuminating apparatus of FIG. 1.

FIG. 1 is a perspective view illustrating an illuminating apparatus according to a first exemplary embodiment, and FIG. 2 is a plan view of the illuminating apparatus of FIG. 1.

Referring to FIGS. 1 and 2, an illuminating apparatus 100 according to the first exemplary embodiment includes a support member 110 and a light emitting unit 120.

The support member 110 has a rectangular box shape that has a shallow depth and an open top end. In more detail, the support member 110 consists of a light source support member 111 of a rectangular plate shape and a side wall 112 extending from an edge of the light source support member 111.

The light source support member 111 supports the light emitting unit 120 mounted on a surface 111a of the light source support member 111. The side wall 112 forms an internal space of the illuminating apparatus 100, and may be coupled to another member (not illustrated) to cover the support member 110. In the present exemplary embodiment, the side wall 112 is formed perpendicular to the light source support member 111. Alternatively, the side wall 112 may be formed to be inclined at an obtuse angle with respect to the light source support member 111.

The support member 110 may be formed of a variety of materials. For example, the support member 110 may be formed of a non-metallic material such as plastic or a metallic material such as aluminum. The metallic material may effectively radiate heat generated in the light emitting unit 120.

The light emitting unit 120 is mounted on the surface 111a of the light source support member 111 of the support member 110, and, in the present exemplary embodiment, is configured of only one light emitting module. Accordingly, in the description of the illuminating apparatus 100 according to the first exemplary embodiment, reference number 120 will be used as a number to refer to the light emitting unit, or a number to refer to the light emitting module configuring the light emitting unit.

The only light emitting module 120 configuring the light emitting unit 120 includes a printed circuit board (PCB) 130 of a strip shape that is mounted on the light source support member 111 of the support member 110, and a plurality of light source packages 140 that is mounted on the printed circuit board 130 and generates light.

The printed circuit board 130 supports the plurality of light source packages 140 that is mounted on a top surface thereof, and delivers power being supplied from a power source (not illustrated) to the light source packages 140.

The light source packages 140 provide light in a direction which the surface 111a of the support member 110 faces (Z direction in FIG. 1). A structure of each of the light source packages 140 will be described hereinafter with reference to FIG. 3 that is a sectional view taken along a line I-I in FIG. 2.

Figure 3:
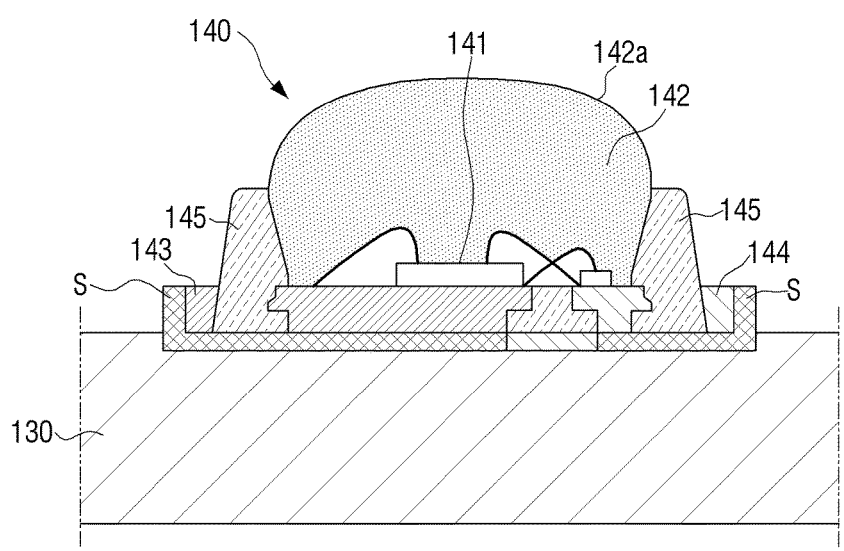
FIG. 3 is a sectional view illustrating the illuminating apparatus of FIG. 2 taken along a line I-I in FIG. 2.

As illustrated in FIG. 3, the light source package 140 is mounted on the above-described printed circuit board 130 by using solder S, and includes a light-emitting diode 141, a fluorescent member 142, a pair of electrodes 143 and 144, and a frame 145.

The light-emitting diode 141 is a component to generate light. The fluorescent member 142 converts light of a specific color generated by the light-emitting diode 141 into light of a different color (e.g. white color) that is suitable for use in the illuminating apparatus 100. Also, the fluorescent member 142 may widely diffuse the light through an outer surface 142a in the form of a convex lens. Alternatively, an optical lens (not illustrated) placed to cover the light source package 140 may perform the light diffusion function instead of the fluorescent member 142. The pair of electrodes 143 and 144 are components to electrically connect the light-emitting diode 141 and the printed circuit board 130. The frame 145 is a component to package the light-emitting diode 141, the fluorescent member 142, and the pair of electrodes 143 and 144, as described above.

Referring again to FIG. 2, the light emitting module 120 includes a body portion 121 and four corner side extending portions 123, 124, 125, and 126 extending from the body portion 121.

The body portion 121 is extended along a lengthwise direction (X direction in FIG. 2) of the support member 110. Alternatively, the body portion 121 may be arranged along a widthwise direction (Y direction in FIG. 2) of the support member 110, or along a direction different from the lengthwise direction and the widthwise direction.

The four corner side extending portions 123, 124, 125, and 126 correspond to four corner areas 113, 114, 115, and 116 formed in the light source support member 111, respectively. In more detail, a first corner side extending portion 123 corresponds to a first corner area 113 of the light source support member 111, a second corner side extending portion 124 corresponds to a second corner area 114, a third corner side extending portion 125 corresponds to a third corner area 115 of the light source support member 111, and a fourth corner side extending portion 126 corresponds to a fourth corner area 116 of the light source support member 111.

The first corner side extending portion 123 is extended from one end 121a of the body portion 121 to the first corner area 113. In more detail, the first corner side extending portion 123 is arranged along a direction α1 that divides the first corner area 113 corresponding thereto into two areas 113a and 113b. The first corner side extending portion 123 is arranged close to the first corner area 113 to increase the brightness of the first corner area 113, thereby preventing a dark region from appearing in the first corner area 113.

The second corner side extending portion 124 is extended from the one end 121a of the body portion 121 to the second corner area 114. In more detail, the second corner side extending portion 124 is arranged along a direction α2 that divides the second corner area 114 corresponding thereto into two areas 114a and 114b. The second corner side extending portion 124 is arranged close to the second corner area 114 to increase the brightness of the second corner area 114, thereby preventing a dark region from appearing in the second corner area 114.

The third corner side extending portion 125 is extended from the other end 121b of the body portion 121 to the third corner area 115. In more detail, the third corner side extending portion 125 is arranged along a direction α3 that divides the third corner area 115 corresponding thereto into two areas 115a and 115b. The third corner side extending portion 125 is arranged close to the third corner area 115 to increase the brightness of the third corner area 115, thereby preventing a dark region from appearing in the third corner area 115.

The fourth corner side extending portion 126 is extended from the other end 121b of the body portion 121 to the fourth corner area 116. In more detail, the fourth corner side extending portion 126 is arranged along a direction α4 that divides the fourth corner area 116 corresponding thereto into two areas 116a and 116b. The fourth corner side extending portion 126 is arranged close to the fourth corner area 116 to increase the brightness of the fourth corner area 116, thereby preventing a dark region from appearing in the fourth corner area 116.

In the case of the illuminating apparatus 100 according to the first exemplary embodiment, because the four corner side extending portions 123, 124, 125, and 126 that configure a portion of the light emitting module 120 and are extended toward the four corner areas 113, 114, 115, and 116 are provided, a phenomenon in which dark regions appear in the four corner areas 113, 114, 115, and 116 may be prevented.

Figure 4:
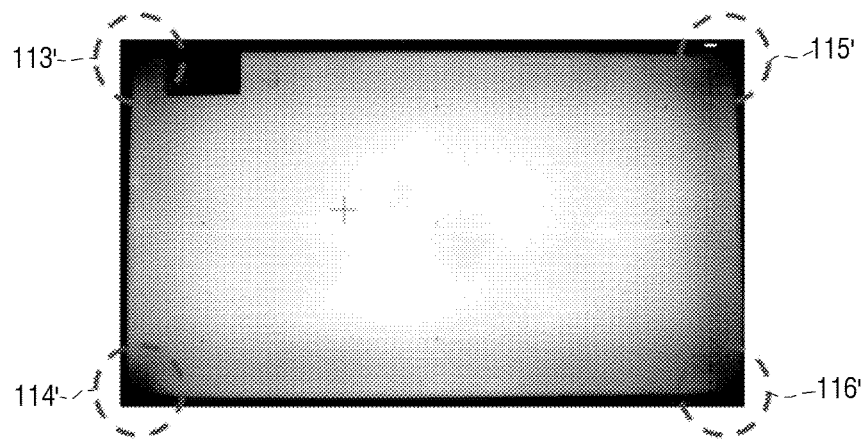
FIG. 4 is a brightness photograph of a illuminating apparatus in the related art.
Figure 5:
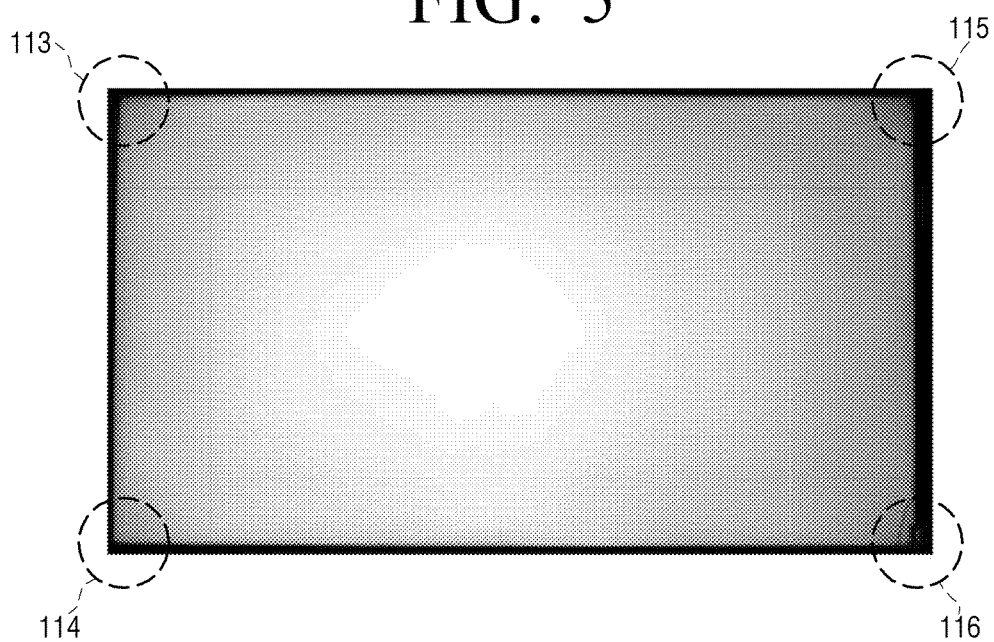
FIG. 5 is a brightness photograph of the illuminating apparatus illustrated in FIG. 1.

With respect to advantages of preventing the dark regions, FIGS. 4 and 5 are referred to. FIG. 4 is a brightness photograph of an illuminating apparatus in the related art. The illuminating apparatus of FIG. 4 does not have corner side extending portions. FIG. 5 is a brightness photograph of the illuminating apparatus illustrated in FIG. 1. In the case of the illuminating apparatus in the related art, as illustrated in FIG. 4, the dark regions appear in the four corner areas 113', 114', 115', and 116'. However, in the case of the illuminating apparatus 100 according to exemplary embodiments, as illustrated in FIG. 5, it can be seen that the dark regions do not appear substantially in the four corner areas 113, 114, 115, and 116.

Figure 7:
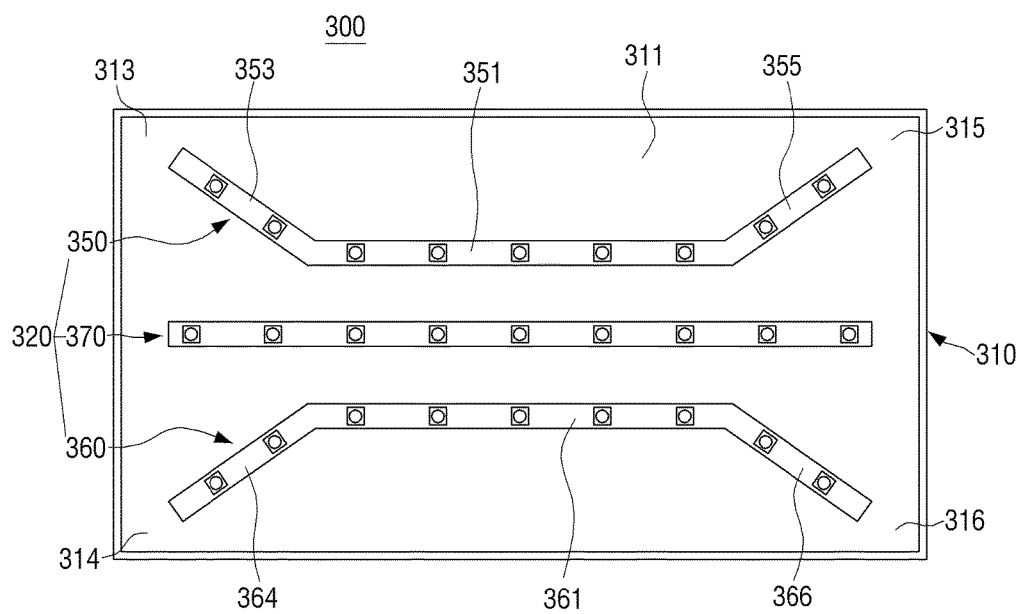
FIG. 7 is a view similar to FIG. 6, and a plan view schematically illustrating an illuminating apparatus according to a third exemplary embodiment.
Figure 8:
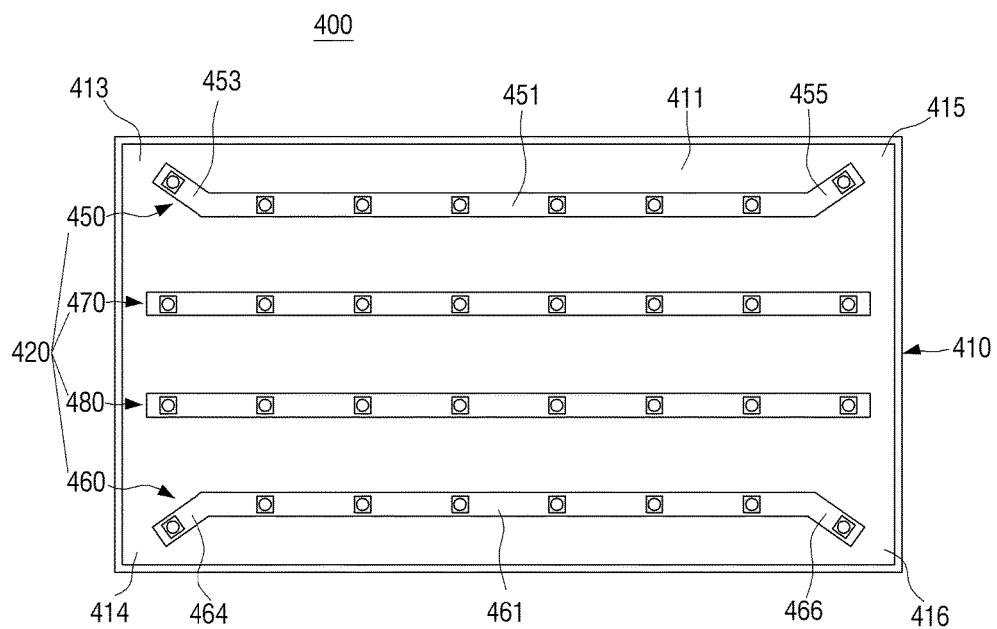
FIG. 8 is a view similar to FIG. 7, and a plan view schematically illustrating an illuminating apparatus according to a fourth exemplary embodiment.

As described above, in the case of the illuminating apparatus 100 according to the first exemplary embodiment, the light emitting unit 120 consists of only one light emitting module 120. However, in alternative illuminating apparatuses, the light emitting unit may be configured with two or more light emitting modules. Such alternative illuminating apparatuses are illustrated in FIGS. 6, 7, and 8.

First, FIG. 6 that is a view similar to FIG. 2, and illustrates a plan view of an illuminating apparatus according to a second exemplary embodiment will be described.

Figure 6:
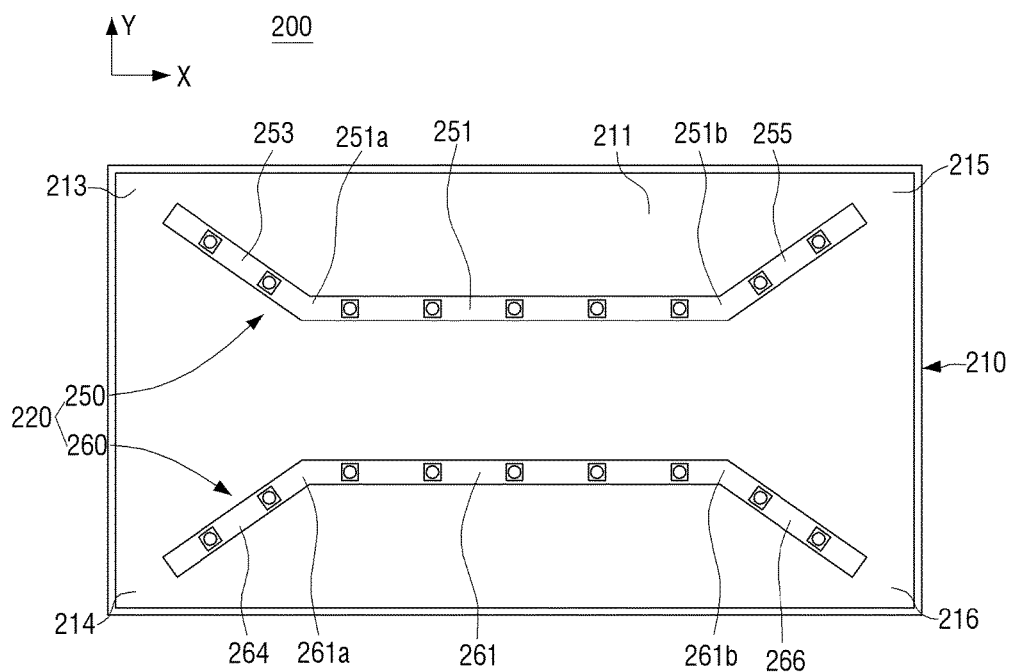
FIG. 6 is a view similar to FIG. 2, and a plan view schematically illustrating an illuminating apparatus according to a second exemplary embodiment.

Referring to FIG. 6, similar to the illuminating apparatus 100 according to the first exemplary embodiment, as described above, the illuminating apparatus 200 according to the second exemplary embodiment includes a support member 210 and a light emitting unit 220.

The support member 210 is the same as the support member 110 of the first exemplary embodiment, as described above. However, the light emitting unit 220 consists of two light emitting modules 250 and 260, and thus is distinguished from the light emitting unit 120 of the first exemplary embodiment, as described above. In other words, the light emitting unit 220 consists of a first light emitting module 250 and a second light emitting module 260.

The first light emitting module 250 includes a first body portion 251 that is extended along the lengthwise direction (X direction in FIG. 6) of a light source support member 211, a first corner side extending portion 253 that is extended from one end 251a of the first body portion 251 to a first corner area 213 of the light source support member 211, and a second corner side extending portion 255 that is extended from the other end 251b of the first body portion 251 to a second corner area 215 of the light source support member 211.

The second light emitting module 260 includes a second body portion 261 that is extended along the lengthwise direction (X direction in FIG. 6) of the light source support member 211, a third corner side extending portion 264 that is extended from one end 261a of the second body portion 261 to a third corner area 214 of the light source support member 211, and a fourth corner side extending portion 266 that is extended from the other end 261b of the second body portion 261 to a fourth corner area 216 of the light source support member 211.

As described above, the illuminating apparatus 200 is equipped with the first and second corner side extending portions 253 and 255 that configure a portion of the first light emitting module 250 and are extended toward the first and second corner areas 213 and 215, and the third and fourth corner side extending portions 264 and 266 that configure a portion of the second light emitting module 260 and are extended toward the third and fourth corner areas 214 and 216, thereby preventing dark regions from appearing in four corner areas 213, 214, 215, and 216 of the support member 210.

Next, FIG. 7 that is a view similar to FIG. 6, and illustrates a plan view of an illuminating apparatus according to a third exemplary embodiment will be described.

Referring to FIG. 7, similar to the illuminating apparatus 200 according to the second exemplary embodiment, as described above, an illuminating apparatus 300 according to the third exemplary embodiment includes a support member 310 and a light emitting unit 320.

The support member 310 is the same as the support member 210 of the second exemplary embodiment illustrated in FIG. 6. However, the light emitting unit 320 additionally includes a third light emitting module 370 arranged between a first light emitting module 350 and a second light emitting module 360, and thus is distinguished from the light emitting unit 220 of the second exemplary embodiment of FIG. 6, as described above. The third light emitting module 370 is arranged parallel to a first body portion 351 of the first light emitting module 350 and a second body portion 361 of the second light emitting module 360, namely along the lengthwise direction of the light source support member 311, but is not provided with any corner side extending portions, unlike the first and second light emitting modules 350 and 360.

Like the illuminating apparatus 200 illustrated in FIG. 6, the illuminating apparatus 300 is equipped with first and second corner side extending portions 353 and 355 that configure a portion of the first light emitting module 350 and are extended toward first and second corner areas 313 and 315, and third and fourth corner side extending portions 364 and 366 that configure a portion of the second light emitting module 360 and are extended toward third and fourth corner areas 314 and 316, thereby preventing dark regions from appearing in the four corner areas 313, 314, 315, and 316 of the support member 310.

Next, FIG. 8 that is a view similar to FIG. 7, and illustrates a plan view of an illuminating apparatus according to a fourth exemplary embodiment of the present disclosure will be described.

Referring to FIG. 8, similar to the illuminating apparatus 300 according to the third exemplary embodiment, as described above, an illuminating apparatus 400 according to the fourth exemplary embodiment of the present disclosure includes a support member 410 and a light emitting unit 420.

The support member 410 is the same as the support member 310 of the third exemplary embodiment illustrated in FIG. 7. However, the light emitting unit 420 additionally includes a fourth light emitting module 480 as well as a third light emitting module 470 arranged between a first light emitting module 450 and a second light emitting module 460, and thus is distinguished from the light emitting unit 320 of the third exemplary embodiment of FIG. 7, as described above. Like the third light emitting module 470, the fourth light emitting module 480 is arranged along the lengthwise direction of the light source support member 411, but is not provided with any corner side extending portions.

Like the illuminating apparatus 300 illustrated in FIG. 7, the illuminating apparatus 400 is equipped with first and second corner side extending portions 453 and 455 that configure a portion of the first light emitting module 450 and are extended toward first and second corner areas 413 and 415, and third and fourth corner side extending portions 464 and 466 that configure a portion of the second light emitting module 460 and are extended toward third and fourth corner areas 414 and 416, thereby preventing dark regions from appearing in four corner areas 413, 414, 415, and 416 of the support member 410.

The illuminating apparatuses 100, 200, 300, and 400, as described above, may be applied to various electronic apparatuses such as lighting devices, promotional signboards, and display apparatuses. As an example, FIG. 9 that illustrates schematically an exploded perspective view of a liquid crystal display 1 to which the illuminating apparatus 100 according to the first exemplary embodiment is applied will be described.

Figure 9:
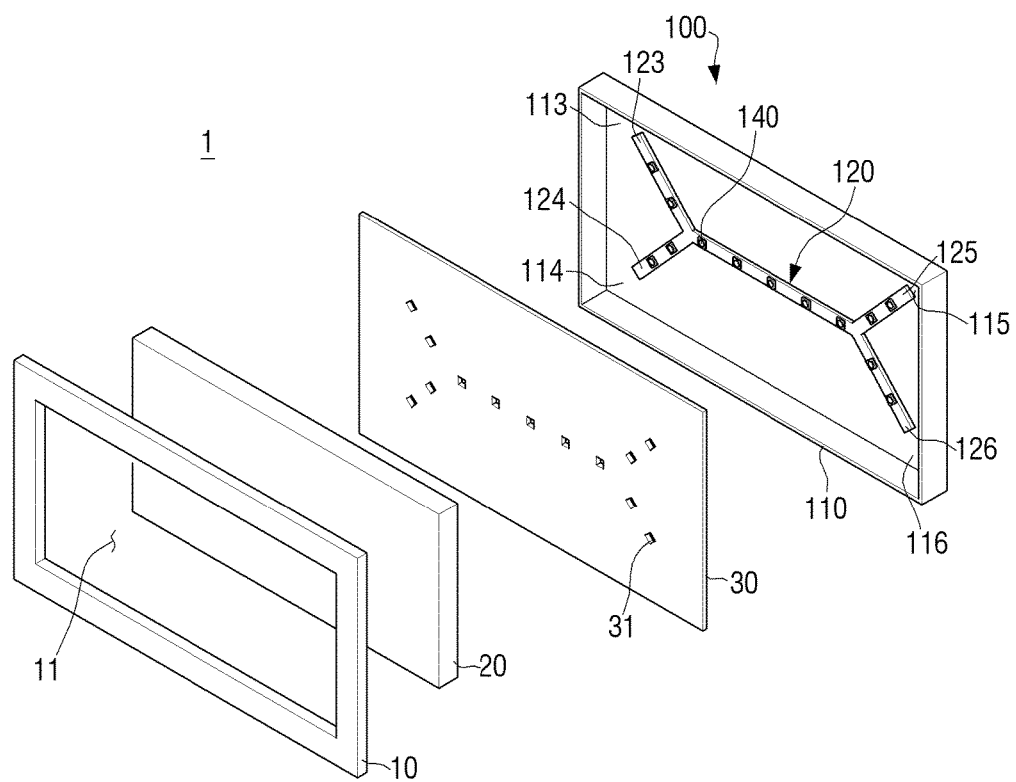
FIG. 9 is an exploded perspective view schematically illustrating a liquid crystal display to which an illuminating apparatus according to a first exemplary embodiment is applied.

Referring to FIG. 9, the liquid crystal display 1 includes the illuminating apparatus 100, a cover member 10, a liquid crystal panel 20, and a reflection sheet 30.

As described above, the illuminating apparatus 100 includes the support member 110 and the light emitting unit 120. In the field of displays, such support member 110 is often referred to as a bottom chassis. The light emitting unit 120 is equipped with four corner side extending portions 123, 124, 125, and 126 to prevent dark regions from appearing in the four corner areas 113, 114, 115, and 116 of the support member 110.

The cover member 10 is coupled to the support member 110 so as to package internal components such as the liquid crystal panel 20, etc. as a single apparatus. The cover member 10 is provided with a rectangular opening 11 that lets videos, which the liquid crystal panel 20 displays, to be visible outside the cover member 10. In the field of display, such cover member 10 is often referred to as a top chassis.

The liquid crystal panel 20 is disposed between the support member 110 and the cover member 10, and displays videos by using light that the illuminating apparatus 100 provides by a direct lighting method.

The reflection sheet 30 is attached to an inner surface of the support member 110 to increase the optical efficiency of the light emitting unit 120. The reflection sheet 30 is arranged to cover the light emitting unit 120 disposed in the support member 110, but light source packages 140 of the light emitting unit 120 are exposed through a plurality of exposure holes 31 formed in the reflection sheet 30.

In the case of the liquid crystal display 1 illustrated in FIG. 9, a phenomenon in which dark regions appear in the corner areas 113, 114, 115, and 116 of the support member 110 may be prevented by the four corner side extending portions 123, 124, 125, and 126 included in the light emitting unit 120. Therefore, because the dark regions may be prevented, the quality of videos being provided by the liquid crystal display 1 may be prevented from being degraded due to the dark regions.

Figure 10:
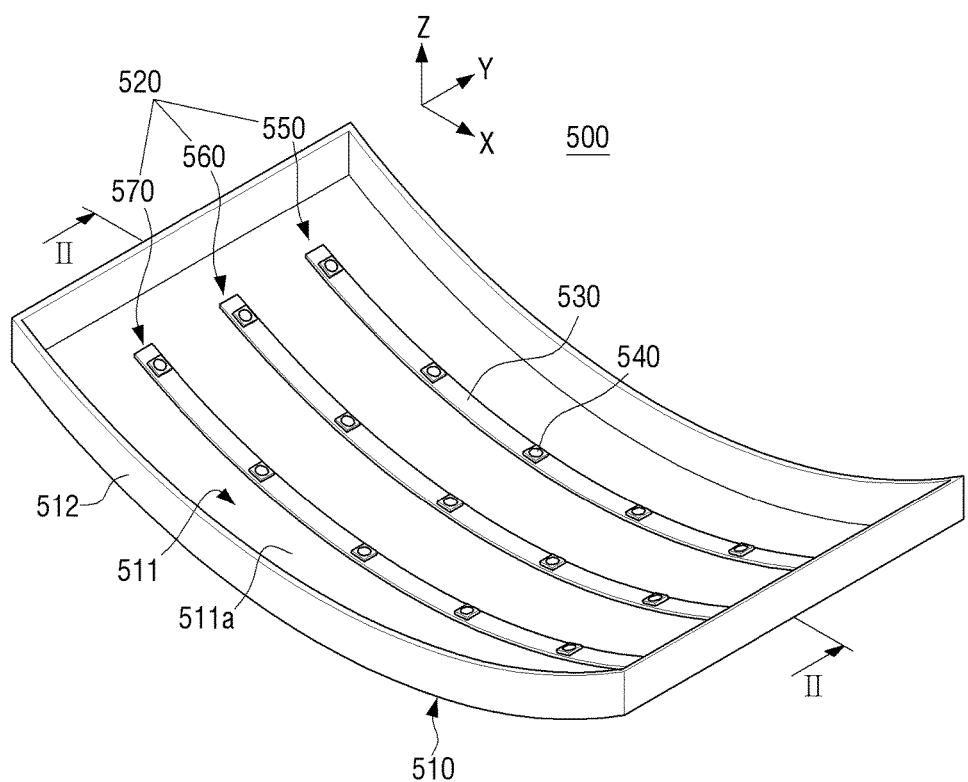
FIG. 10 is a perspective view schematically illustrating an illuminating apparatus according to a fifth exemplary embodiment.
Figure 11:
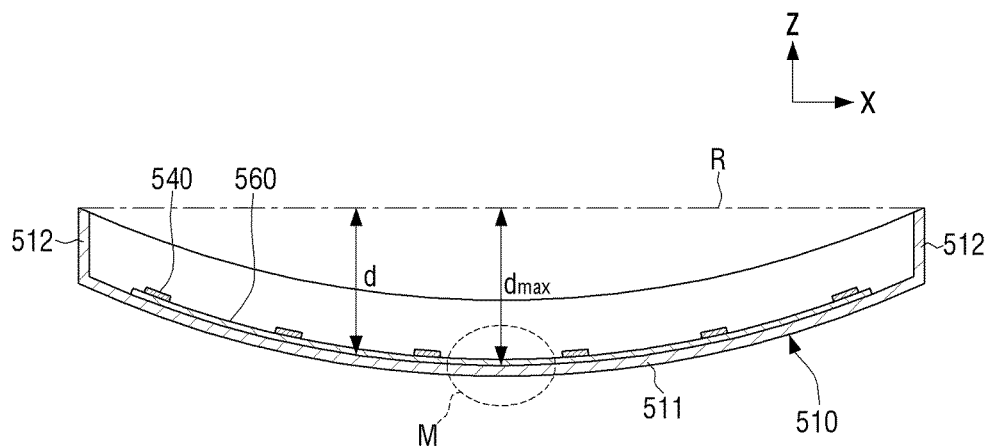
FIG. 11 is a sectional view illustrating the illuminating apparatus of FIG. 10 taken along a line II-II in FIG. 10.

FIG. 10 is a perspective view illustrating an illuminating apparatus according to a fifth exemplary embodiment, and FIG. 11 is a sectional view illustrating the illuminating apparatus of FIG. 10 taken along a line ∥-∥ in FIG. 10.

Referring to FIGS. 10 and 11, the illuminating apparatus 500 according to the fifth exemplary embodiment includes a support member 510 and a light emitting unit 520.

The support member 510 is formed in a shape of a box that has a shallow depth and an open top side. In detail, the support member 510 consists of a light source support member 511 formed in the form of a concave curved plate and a side wall 512 extending vertically from an edge of the light source support member 511. Here, the light source support member 511 supports a light emitting unit 520 disposed on a surface 511a of the light source support member 511, and the side wall 512 forms an inner space of the illuminating apparatus 500.

The light emitting unit 520 consists of three light emitting modules 550, 560, and 570. In an alternative embodiment, the number of the light emitting modules configuring the light emitting unit 520 may be selected differently such as, for example, 1, 3, 4, etc. A first light emitting module 550, a second light emitting module 560, and a third light emitting module 570 have the same structure as each other.

The first light emitting module 550 among the three light emitting modules 550, 560, and 570 may include a printed circuit board (PCB) 530 of a strip shape and a plurality of light source packages 540 that is mounted on the printed circuit board 530 and generates light. The printed circuit board 530 supports the plurality of light source packages 540, and delivers power being supplied from a power source (not illustrated) to the light source packages 540. The light source packages 540 are the same as the light source packages 140 (see FIGS. 1, 2 and 3) of the illuminating apparatus 100, as described above, therefore, description thereof will be omitted.

Referring to FIG. 11, since the light source support member 511 of the support member 510 has the shape of a curved plate, the light source support member 511 has non-uniform depth along the lengthwise direction (X direction in FIG. 11) of the support member 510. In FIG. 11, 'R' represents a horizontal imaginary reference plane placed on the support member 510, and 'd' represents a depth from the reference plane R to any point on the light source support member 511. From FIG. 11 it can be seen that as the point goes closer to the center of the light source support member 511 in the lengthwise direction (X direction) of the support member 510, the depth d of the point is deeper. Accordingly, the light source support member 511 has the maximum depth dmax in the central area M thereof.

If the depth d of the light source support member 111 is uniform in contrast to the present exemplary embodiment, recycling or mixing of light occurs relatively less in the central area M of the light source support member 111 that is far away from the side wall 512, so light uniformity may be reduced relatively. The reduction of the light uniformity may result in mura (i.e., unevenness, irregularity, lack of uniformity, or nonuniformity of brightness across a display) in the central area M.

However, in the present exemplary embodiment, since the support member 110 is designed to have the maximum depth in the central area M of the light source support member 111, mixture of light in the central area M may be increased so that the light uniformity in the central area M is improved. As a result, generation of the mura that can occur when the light uniformity is degraded may be prevented.

Figure 12:
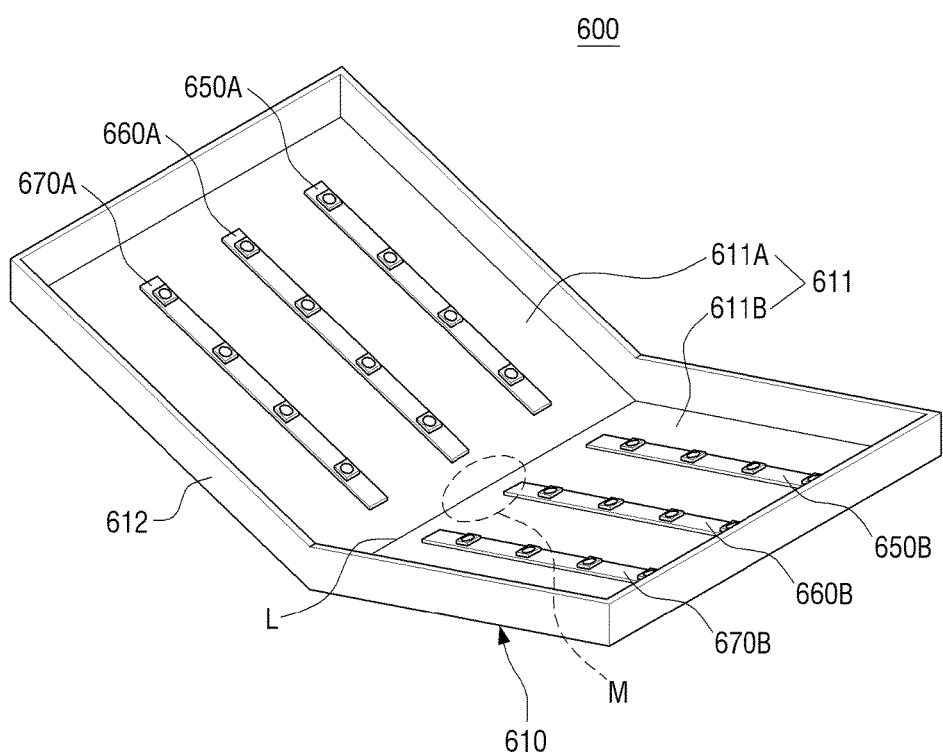
FIG. 12 is a perspective view schematically illustrating an illuminating apparatus according to a sixth exemplary embodiment.

Referring to FIG. 12 that illustrates a perspective view of an illuminating apparatus according to a sixth exemplary embodiment, the illuminating apparatus 600 according to the sixth exemplary embodiment includes a support member 610 consisting of a light source support member 611 and a side wall 612.

The light source support member 611 has a plate shape that is bent at a bending line L to be a first support portion 611A and a second support portion 611B. The first and second support portions 611A and 611B bounded by the bending line L are arranged in an obtuse angle with respect to each other. Three light emitting modules 650A, 660A, and 670A mounted on the first support portion 611A and three light emitting modules 650B, 660B, and 670B mounted on the second support portion 611B configure the light emitting unit.

Since the light source support member 611 has a bent shape, the light source support member 611 has non-uniform depth and the maximum depth in the central area M thereof. Therefore, as with the aforementioned illuminating apparatus 500, in the case of the illuminating apparatus 600 according to the sixth exemplary embodiment, the light uniformity in the central area M is improved so that appearance of the mura in the central area M may be prevented.

Figure 13:
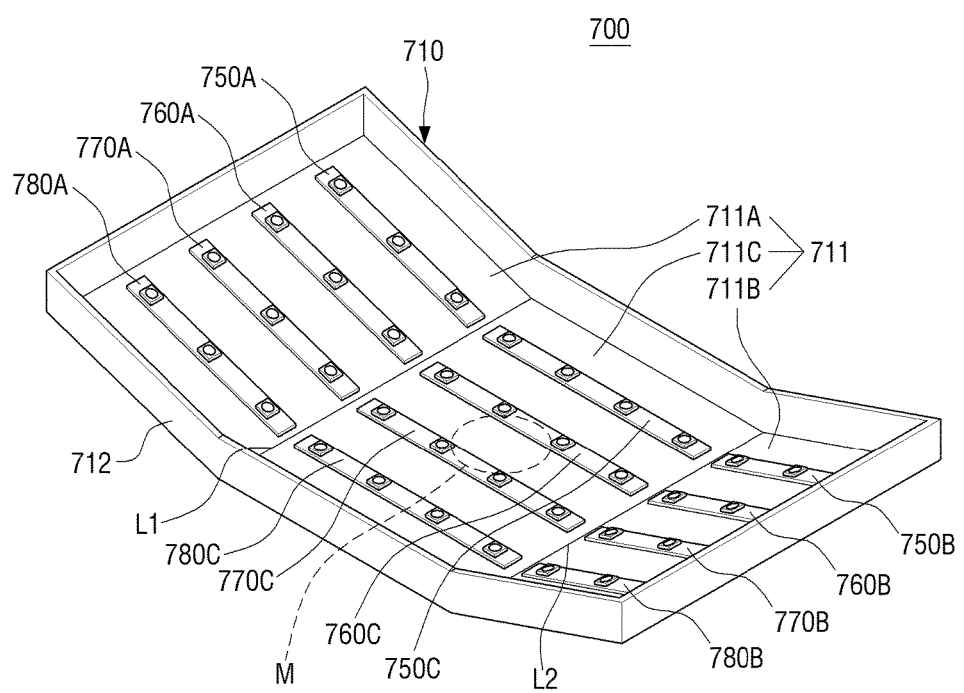
FIG. 13 is a perspective view schematically illustrating an illuminating apparatus according to a seventh exemplary embodiment.

Referring to FIG. 13 that illustrates a perspective view of an illuminating apparatus according to a seventh exemplary embodiment, the illuminating apparatus 700 according to the seventh exemplary embodiment includes a support member 710 consisting of a light source support member 711 and a side wall 712.

The light source support member 711 has a plate shape that is bent at two bending lines L1 and L2 to be a first support portion 711A, a second support portion 711B, and a third support portion 711C. The first and third support portions 711A and 711C bounded by the first bending line L1 are arranged in an obtuse angle with respect to each other, and the second and third support portions 711B and 711C bounded by the second bending line L2 are arranged in an obtuse angle with respect to each other. Four light emitting modules 750A, 760A, 770A, and 780A mounted on the first support portion 711A, four light emitting modules 750B, 760B, 770B, and 780B mounted on the second support portion 711B, and four light emitting modules 750C, 760C, 770C, and 780C mounted on the third support portion 711C configure the light emitting unit.

Since the light source support member 711 has a bent shape, the light source support member 711 has non-uniform depth and the maximum depth in the central area M thereof. Therefore, as with the aforementioned illuminating apparatus 500, in the case of the illuminating apparatus 700 according to the seventh exemplary embodiment, the light uniformity in the central area M is improved so that appearance of mura in the central area M may be prevented.

The illuminating apparatuses 500, 600, and 700, as described above, may be applied to various electronic apparatuses such as lighting devices, promotional signboards, and display apparatuses. As an example, FIG. 14 illustrates schematically an exploded perspective view of a liquid crystal display 2 to which the illuminating apparatus 500 according to the fifth exemplary embodiment is applied will be described.

Figure 14:
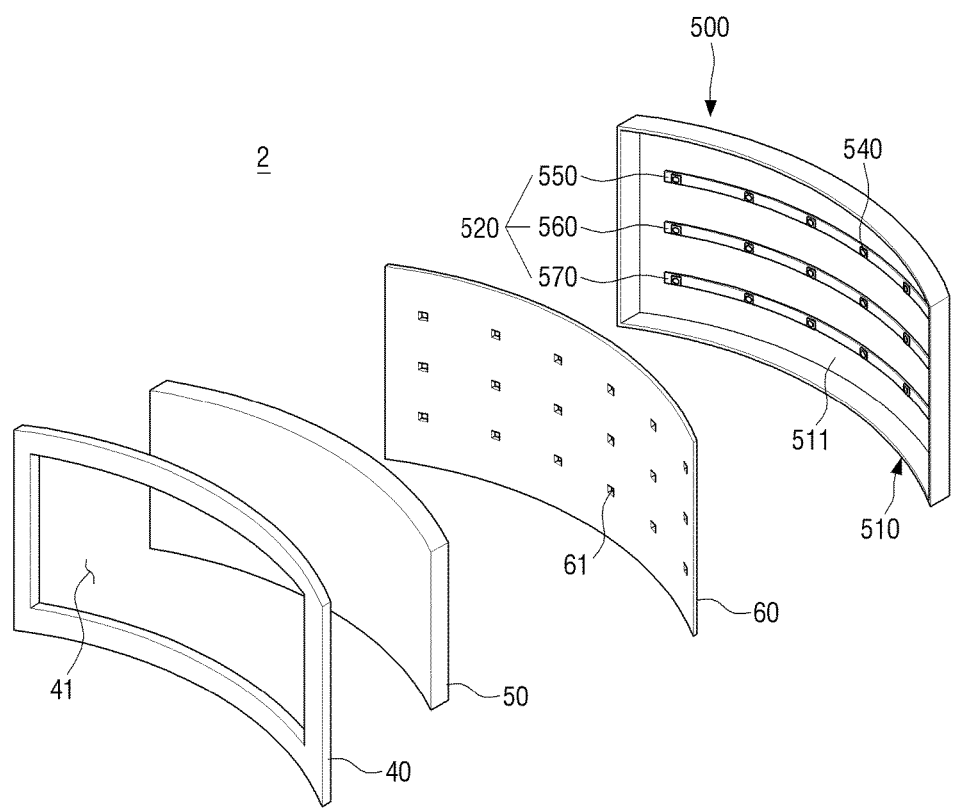
FIG. 14 is an exploded perspective view schematically illustrating a liquid crystal display to which an illuminating apparatus according to a fifth exemplary embodiment is applied.

Referring to FIG. 14, the liquid crystal display 2 includes the illuminating apparatus 500, a cover member 40, a liquid crystal panel 50, and a reflection sheet 60.

As described above, the illuminating apparatus 500 includes the support member 510 and the light emitting unit 520. Because the light source support member 511 of the support member 510 is formed in the curved plate, the support member 110 has the maximum depth in the central area M (see FIG. 11) thereof.

The cover member 40, the liquid crystal panel 50, and the reflection sheet 60 are similar to the cover member 10, liquid crystal panel 20, and reflection sheet 30 illustrated in FIG. 9, respectively. However, each of the cover member 40, the liquid crystal panel 50, and the reflection sheet 60 is bent corresponding to the shape of the light source support member 511 of the support member 510, so it takes a shape having curvature. Here, it can be seen that the liquid crystal display 2 corresponds to a kind of curved display. Reference number 61 refers to a plurality of exposure holes for exposing the light source packages 540.

In the case of the liquid crystal display 2 illustrated in FIG. 14, because the support member 510 has the maximum depth in the central area M thereof, mura may be prevented from appearing in the central area M. As a result, quality degradation of videos being provided by the liquid crystal display 2 may be prevented.

Figure 15:
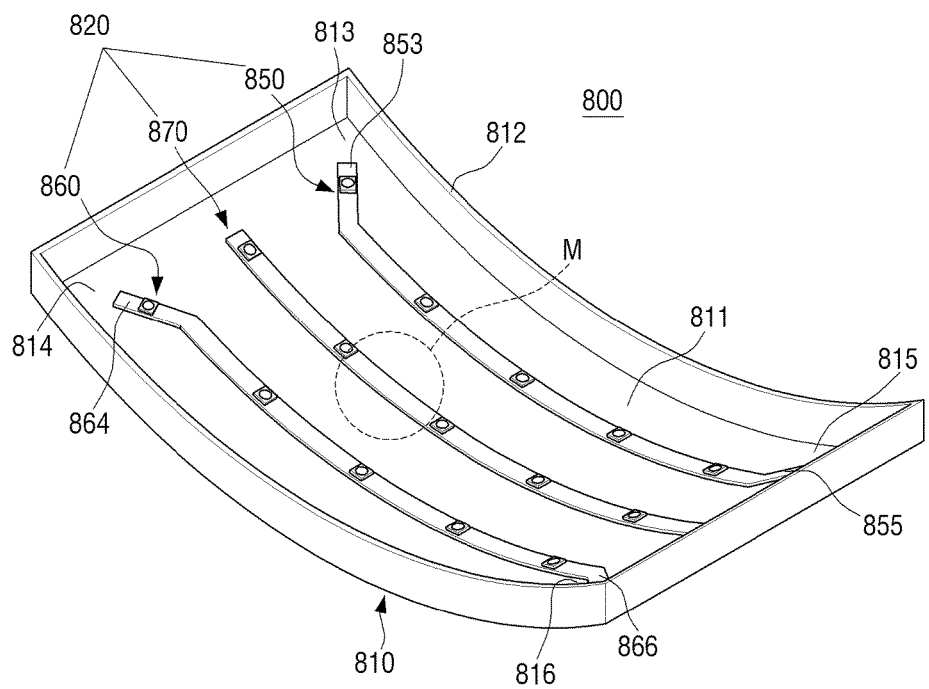
FIG. 15 is a perspective view schematically illustrating an illuminating apparatus according to an eighth exemplary embodiment.

Referring to FIG. 15 that illustrates a perspective view of an illuminating apparatus according to an eighth exemplary embodiment, the illuminating apparatus 800 includes a support member 810 and a light emitting unit 820.

The support member 810 consists of the light source support member 811 and a side wall 812. As with the support member 510 illustrated in FIG. 10, the light source support member 811 of the support member 810 has a curved plate shape and the maximum depth in the central area M thereof. Accordingly, in the illuminating apparatus 800 according to the present exemplary embodiment, mura may be prevented from appearing in the central area M of the light source support member 811.

Similar to the light emitting unit 320 of FIG. 7, as described above, the light emitting unit 820 consists of three light emitting modules 850, 860, and 870. A first light emitting module 850 includes two corner side extending portions 853 and 855 extended towards two corner areas 813 and 815 of the light source support member 811, and a second light emitting module 860 includes the other two corner side extending portions 864 and 866 extended towards the other two corner areas 814 and 816 of the light source support member 811. Because the light emitting unit 820 is equipped with a total of four corner side extending portions 853, 855, 864, and 866, dark regions may be prevented from appearing in the four corner areas 813, 814, 815, and 816.

As described above, with the illuminating apparatus 800 according to the eighth exemplary embodiment, because appearance of mura in the central area M of the support member 810 and appearance of dark regions in the four corner areas 813, 814, 815, and 816 of the support member 810 are prevented, light uniformity of the illuminating apparatus 800 may be improved.

While exemplary embodiments have been described, it will be understood by those of ordinary skill in the art that additional variations and modifications may be made therein without departing from the spirit and scope of the inventive concept as defined by the appended claims.

What is claimed is:

1. A display apparatus comprising:
    a support member comprising a light source support member;
    a display panel disposed in front of the support member and configured to display video images; and
    a first light emitting module and a second light emitting module which are spaced apart from each other, each of the first light emitting module and the second light emitting module comprising:
    a strip-shaped printed circuit board, mounted on the light source support member, including a body portion extending along one direction, a pair of corner side extending portions, each of the corner side extending portions extending in an inclined direction from an end of the body portion towards a corner area of the light source support member, and
    a plurality of light source packages mounted on the strip-shaped printed circuit board and configured to provide light to the display panel,
    wherein the body portion of the first light emitting module is disposed to be parallel to the body portion of the second light emitting module.

2. The display apparatus as claimed in claim 1, wherein the body portion of the first light emitting module and the body portion of the second light emitting module extend in a longitudinal direction of the light source support member.

3. The display apparatus as claimed in claim 1, wherein each of the corner side extending portions is bent towards the corner area of the light source support member.

4. The display apparatus as claimed in claim 1, wherein the display apparatus further comprises a cover member that is disposed in front of the support member and configured to cover the support member.

* * * * *